United States Patent
Smith

(10) Patent No.: US 6,657,867 B2
(45) Date of Patent: Dec. 2, 2003

(54) HINGED DOOR FOR ACCESS TO ADD-IN CARDS

(75) Inventor: Kelly K. Smith, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/017,102

(22) Filed: Dec. 14, 2001

(65) Prior Publication Data

US 2003/0112593 A1 Jun. 19, 2003

(51) Int. Cl.[7] .............................. G06F 1/16; H05K 5/00

(52) U.S. Cl. ..................... 361/725; 361/724; 361/727; 361/683; 312/223.2; 312/223.3

(58) Field of Search ................................ 361/683–800; 312/223.1, 223.2, 223.3; 439/61

(56) References Cited

U.S. PATENT DOCUMENTS 6,307,742 B1 * 10/2001 Diaz et al. .................. 361/683

* cited by examiner

Primary Examiner—Darren Schuberg
Assistant Examiner—Anthony Q. Edwards

(57) ABSTRACT

The present invention provides a system that enables an add-in card to be removed from a densely packaged server while the server is operating. A hinged door, integral to the side of the server chassis, opens to allow access to the add-in card slots. A specially designed server chassis with a reduced height rail allows the door opening to be large enough to allow access to multiple add-in cards. The horizontally oriented add-in cards are mounted in a receiving cage that plugs into and is releasably attached to the server board. Thus, by opening the door in the side of the server chassis, individual cards can be installed or removed. If the cards are hot-pluggable, they can be installed or removed while the server is running. Additionally, the entire stack of cards can be removed from the system board as a unit without tools or loose hardware. Both of these features provide advantages that increase the efficiency of servicing and maintaining a densely packaged server unit.

9 Claims, 3 Drawing Sheets

HINGED DOOR FOR ACCESS TO ADD-IN CARDS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to a densely packaged servers. More particularly, the present invention relates to structural methods and apparatus of allowing access to add-in cards in a densely packaged server.

The necessity for specialized computer equipment has increased dramatically over recent years. Corporations, both large and small, as well as individual consumers have come to depend on computers to enhance and assist them in a broad assortment of tasks. For the individual or small business, personal computers are typically relatively compact and streamlined, often comprising a monitor, a keyboard, a mouse, and a CPU "box" that sits on a desktop or on the floor. These personal computers, although considered compact, when deployed in relatively small numbers, can be quite cumbersome and bulky when deployed in larger quantities. It is not uncommon for an organization to require several computers to act as servers controlling their local area networks. For larger corporations that require numerous servers, the traditional CPU package is not practical to house servers. For such operations, an industry standard EIA (Electronics Industries Alliance) rack is often used to contain servers in a stacked arrangement that uses the available space more efficiently.

Such electronics racks are relatively simple structures that closely resemble open-frame bookcases. Computer server/component racks are typically constructed with perforated, hinged front-doors, rigid sides and a removable rear panel. Industry standard 19" EIA electronics racks are designed typically to house a column of electronics packages that are 17¾" in width and with varying depths. The height of an electronics package can vary but, to be compatable with the rack mounting structure, must be an integer multiple of an EIA unit called simply the "U." An EIA U is 1.75 inches. Electronic equipment generally has a height in multiples of "Us," e.g., 1U (1.75"), 2U (3.50"), 3U (5.25"), etc. Although it is preferred that the height of the electronics components be a multiple of the standard EIA unit U, the dimension of the EIA unit is understood to represent a maximum allowable height, including both the height of the component and any clearance required. This amount of clearance aides in the installation of the rack mounted electronics and promotes interference free insertion and removal.

Typically, electronic components may be secured within the rack using a pair of drawer slides. The drawer slides, usually ball-bearing supported rails, are secured in place within the rack frame. Corresponding rails are located on the side surfaces of the electronics component to be mounted, thus allowing the component to be pulled in and out of the rack frame easily to allow quick and frequent access.

As the computing needs of both large and small businesses increase, there is increasing demand for computer servers to become smaller and more compact. This demand is coupled with the demand that the systems be easier to maintain and service. A typical server comprises at least one, and often times more than one, of each of the following components: system board including processors and memory; power supplies; disk drives, including hard disks, floppy drives, CD-ROM drives, etc.; peripheral component interface (PCI) buses and cards, and cooling fans. Mounting all of these components in a densely packaged server, some as small as 1U or 2U, creates many interface issues associated with maintaining and accessing the server.

It is often required during normal operation and maintenance of a server to remove and replace add-in cards, such as PCI cards. Recent advances in technology have enabled these cards to be "hot-pluggable," meaning they can be removed and replaced without turning off the server. In most standard server applications, the cards plug vertically into the system board. These cards can be easily removed or installed into the server from the top of the server chassis. A typical add-in card, oriented vertically, is more than 2U high. Therefore, in densely packaged servers, such as a 2U server, these cards are often installed horizontally.

Many 2U servers utilize a rack that provides attachment for three or four cards to be plugged in horizontally and stacked vertically. Because space in a densely packaged server is very limited, the only way to remove one card was to remove the entire stack of cards. Removing the entire stack of cards normally requires turning off of the server so the cards are no longer hot-pluggable.

Therefore, there remains a need in the art for an arrangement that allows for individual add-in cards to be installed or removed from a densely packaged server without turning off power to the system. The present invention overcomes the deficiencies of the prior art while focusing on these needs.

BRIEF SUMMARY OF THE INVENTION

The present invention overcomes the deficiencies of the prior art by providing a system that enables an add-in card to be removed from a densely packaged server while the server is operating. A hinged door, integral to the side of the server chassis, opens to allow access to the card slots. A specially designed server chassis with a reduced height rail allows the door opening to be large enough to allow access to multiple cards. The horizontally oriented cards are mounted in a receiving cage that plugs into and is releasably attached to the server board. Thus, by opening the door in the side of the server chassis, individual add-in cards can be installed or removed. If the cards are hot-pluggable, they can be installed or removed while the server is running. Additionally, the entire stack of cards can be removed from the system board as a unit without tools or loose hardware. Both of these features provide advantages that increase the efficiency of servicing and maintaining a densely packaged server unit.

BRIEF DESCRIPTION OF THE DRAWINGS

For a more detailed description of the preferred embodiment of the present invention, reference will now be made to the accompanying drawings, wherein.

NOTATION AND NOMENCLATURE

Figure 1:
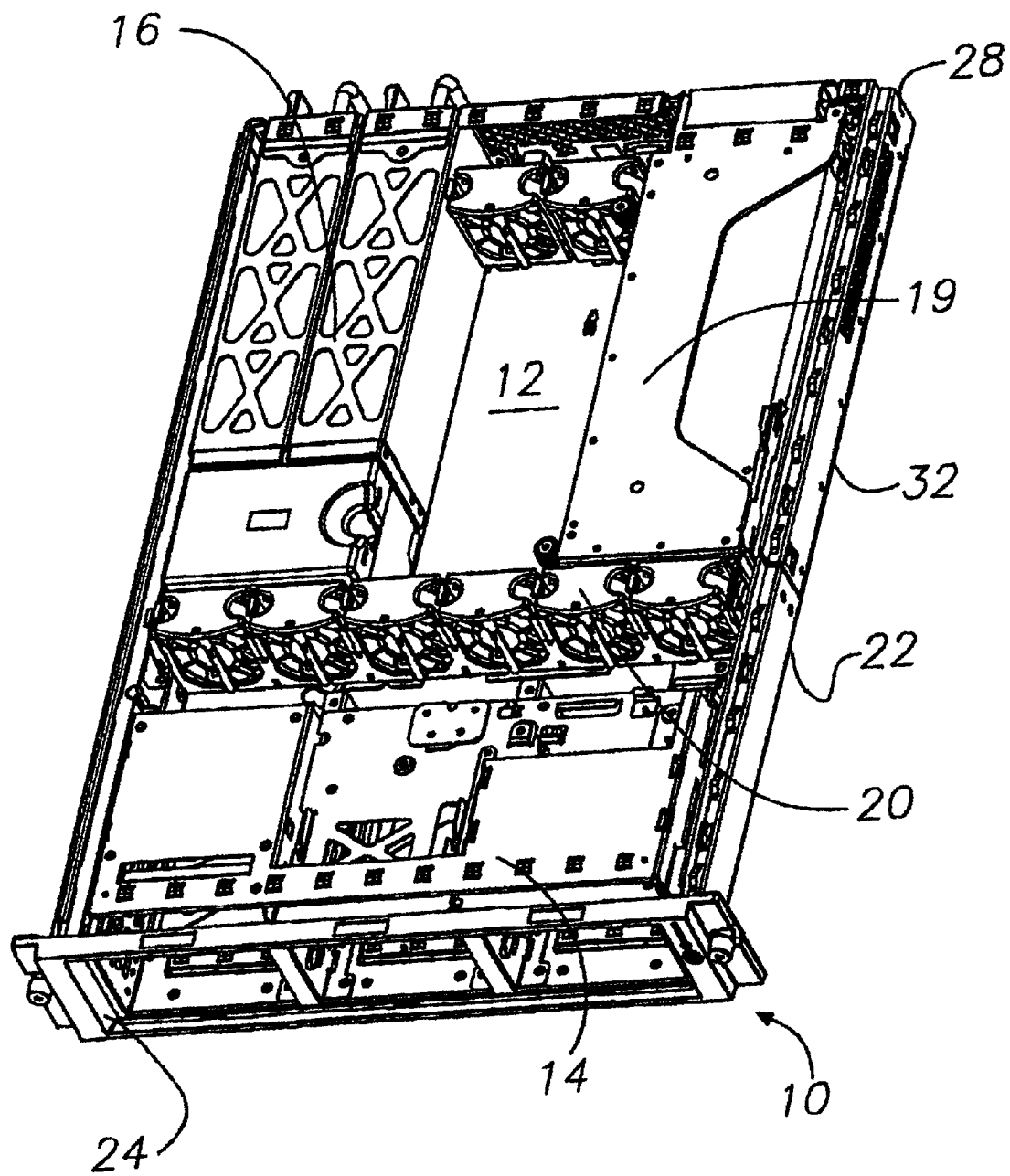
FIG. 1 a perspective view of a densely packaged server constructed in accordance with the present invention.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

The present invention relates to methods and apparatus for accessing and servicing add-in cards. In order to fully describe the preferred embodiments of the present invention, reference will be made throughout this description to a computer server having a height of 2U, but the concepts described herein are applicable to other types and sizes of computers. The present invention is susceptible to embodiments of different forms. The preferred embodiments described herein are intended to be exemplary of the principles of the invention. Accordingly, the scope of this disclosure should not be limited by the embodiments shown and described herein.

Referring to FIG. 1, a server assembly 10 is shown comprising a system board 12, disk drives 14, power supplies 16, a card cage assembly 19, and a fan cage assembly 20. A slide rail 22 is located on either side of the chassis 24 and interfaces with the server cabinet (not shown). During normal operation, a cover (not shown) attaches to the chassis 24 thereby fully enclosing the server assembly 10 and the assembly is contained within the server cabinet. To perform maintenance on the server assembly 10, the assembly is partially extended from the cabinet on rails, somewhat like a drawer being opened. The cover may then be removed to expose the internal components.

Figure 2:
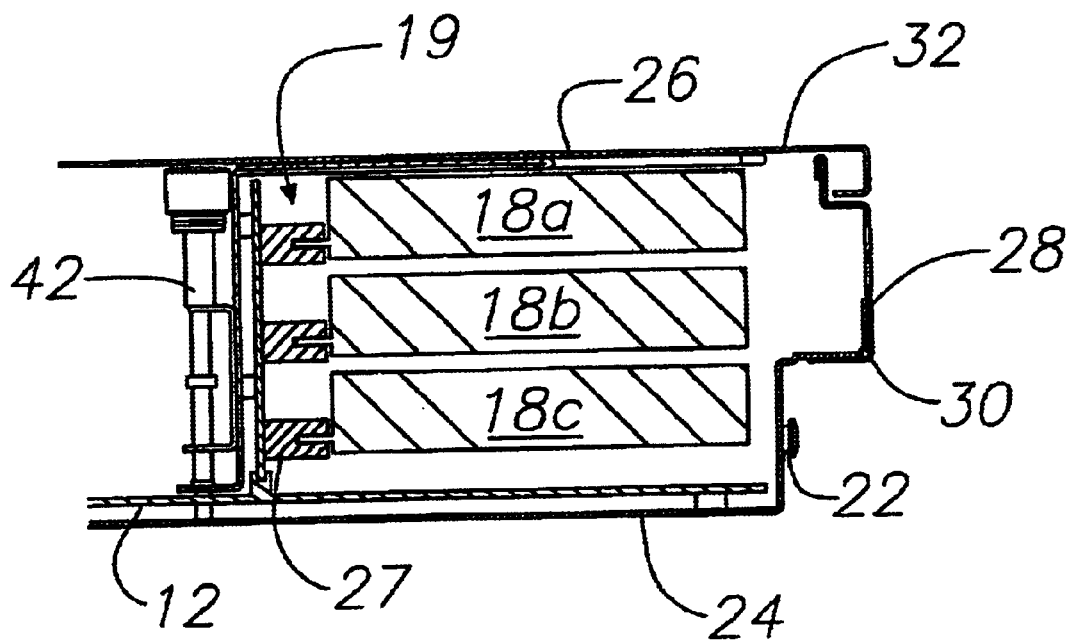
FIG. 2 is a partial front view of a cross-section of a server in an operating mode.

FIG. 2 depicts a partial view of the cross section of the server assembly shown in FIG. 1 where the view is taken across the card cage assembly 19 looking toward the rear of the server assembly 10. The card cage assembly 19 comprises a riser card 27 that connects to the system board 12 and has one or more slots for connection of add-in cards. The riser card 27, and add-in cards when installed, are contained within a cage 26 that provides protection to the cards and attaches to the chassis or system board by one or more fasteners 42. In this embodiment the card cage assembly 19 comprises three add-in cards 18a, 18b, and 18c that are plugged into riser card 27 that is further plugged into system board 12. The riser card 27 is arranged so that the riser card plugs vertically into the system board 12 and allows for the cards 18a, 18b, 18c to be oriented horizontally and stacked in a compact manner.

Still referring to FIG. 2, a partial front view of a cross-section of a server 10 in an operating mode, including add-in cards 18a, 18b, and 18c, shows the card cage assembly 19 in relationship with the chassis 24, including door 28 and slide rail 22. Door 28 is attached to the server chassis 24 by a hinge 30 and is shown in the closed position. In the shown embodiment, the door 28 is maintained in the closed position by the chassis cover 32 but other means to maintain the position of the door are possible.

Door 28 forms the portion of the server chassis 24 adjacent to the card cage assembly 19 and is preferably constructed from the same material as the chassis, normally sheet metal. Hinge 30 that attaches the door 28 to the server chassis 24 is preferably a piano hinge, or other type of hinge that allows the door to open sufficiently to access the cards. The door 28 is preferably of a sufficient height and has a sufficient opening to allow for lateral access to at least two cards 18a, 18b. The size of the slide rail 22 may be set to a height so as to accommodate a door of the desired height and opening.

The combination of the card cage assembly 19 and the door 28 provides new alternatives in maintaining and servicing add-in cards used in densely packaged server applications. Specifically, in accordance with the preferred embodiment, individual PCI cards can be removed and replaced in server 10 while the server is operating, or the entire set of cards can be replaced at once. These methods are illustrated with reference to FIGS. 3a, 3b, and 4.

Alternatively, the door 28 could be arranged to be able to open without removing chassis cover 32. In this embodiment, once the server assembly 10 has been extended from the server cabinet, door 28 can be opened allowing access to the add-in cards without first removing the cover 32. Door 28 would be maintained in the closed position by a spring latch or some other type of easily releasable locking mechanism. The door 28 would preferably be opened without any tools, therefore enabling a toolless removal of the add-in cards.

Figure 3A:
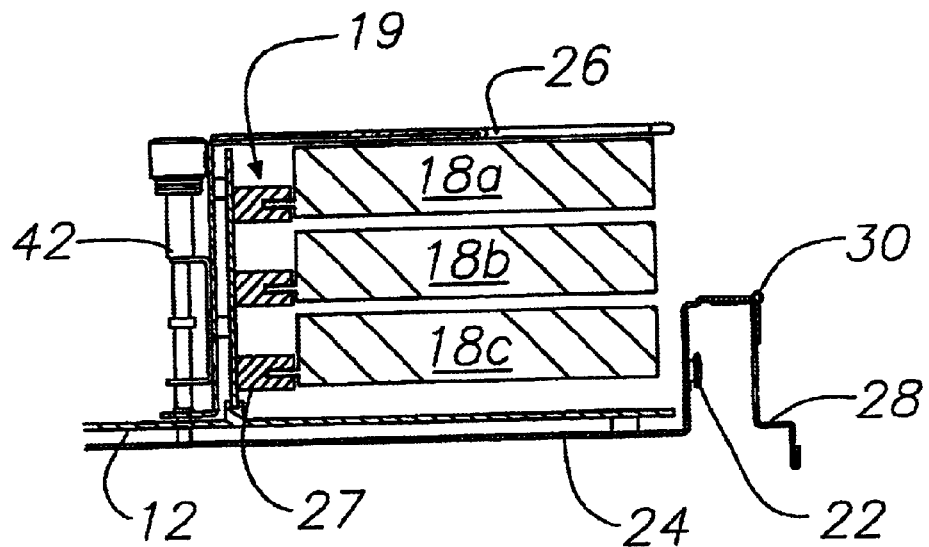
FIG. 3a is a partial front view of a cross-section of a server in a first maintenance mode.
Figure 3B:
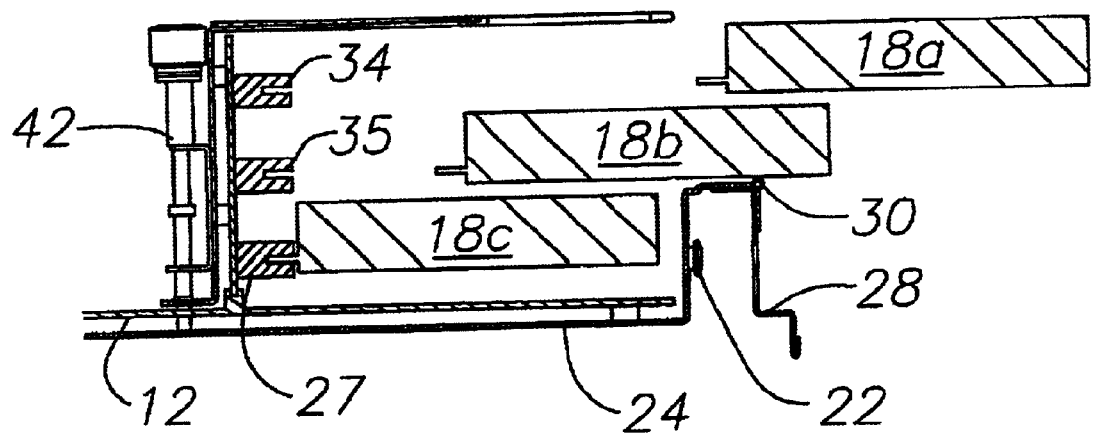
FIG. 3b is a partial front view of a cross-section of a server in a first maintenance mode.

Referring now to FIG. 3a, one alternative for card maintenance is shown for when less than all of the cards need to be removed from the system. Server assembly 10 has been extended from the server cabinet and cover 32 has been removed so that the door 28 can be opened. Referring now to FIG. 3b, once door 28 is opened, the cards 18a, 18b located in the top two slots 34, 35 of the riser card 27 can be removed. Preferably these cards 18a, 18b are hot-pluggable cards so that they can be removed and replaced without interrupting system operations. Further, it is also preferable that cards 18a, 18b can be removed and replaced without the need for any tools.

Figure 4:
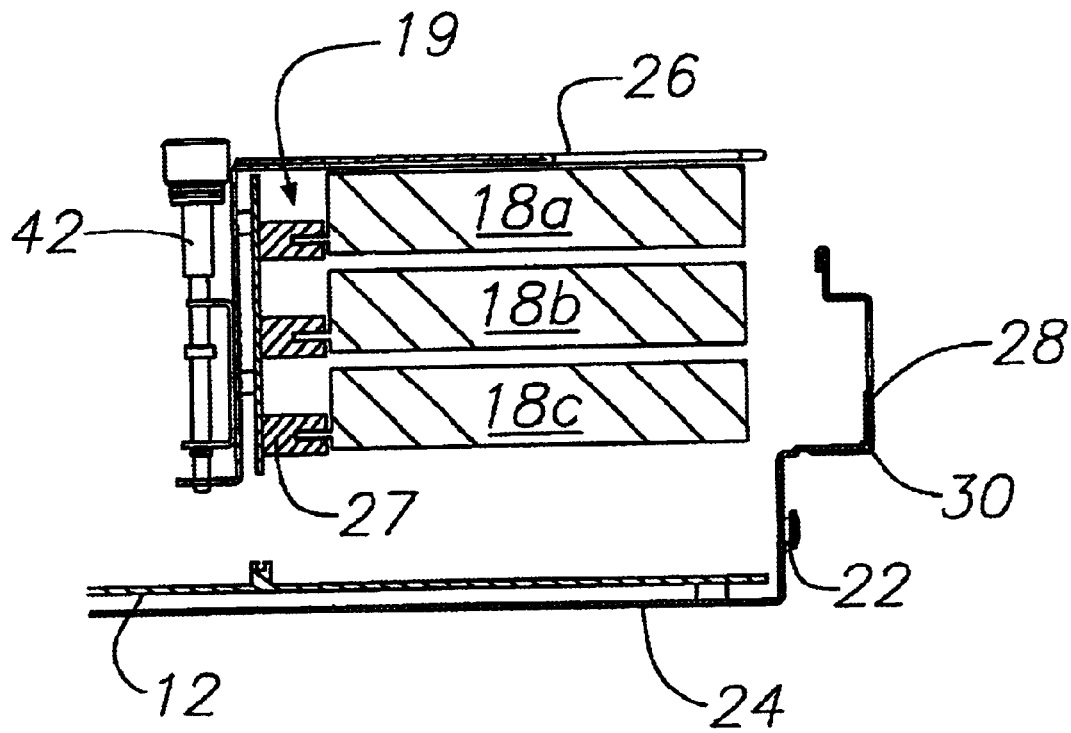
FIG. 4 is a partial front view of a cross-section of a server in a second maintenance mode.

Referring now to FIG. 4, another alternative for card maintenance is shown for the chassis when all of the cards are to be removed from the system. In this case, server assembly 10 has been extended from the server cabinet, and cover 32 has been removed. All three cards 18a, 18b, 18c can be removed simultaneously from the system board 12 by releasing fastener 42, which preferably comprises a thumb screw. This releases the card cage assembly 19 from the system board 12 so that it can be lifted upward, unplugging the riser card 27 from the system board 12 and removing the card cage assembly 19 from the server chassis 24. Once the card cage assembly 19 has been fully removed from the server chassis 24, access can be gained to lowermost card 18c (as wells as the other cards) or the entire card cage assembly 19 can be replaced with another assembly with different cards.

Fastener 42 is preferably constructed so that it can be engaged or disengaged without the need for any tools, and is attached to cage 26 regardless of engagement. Card cage assembly 19 may be retained by two or more fasteners 42. This allows the entire card cage assembly 19 to be removed from the system board 12 without any tools or loose hardware.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

What is claimed is:

1. A computer, comprising:
   a chassis having a front panel, a two side panels, and a rear panel all mounted on a base and forming a rectangular enclosure;
   a slide rail disposed on each side panel and adapted to engage a server cabinet;
   a system board attached to said base;
   at least one add-in card connected to said system board and oriented to be substantially parallel with said system board;
   an opening in said one of the side panels adjacent to said add-in card and sized to allow passage of said add-in card through said opening; and
   a door attached to said side panel by a hinge and moveable between an open and a closed position wherein said open position allows passage of said add-in card and said closed position forms a portion of said side panel and does not allow passage of said add-in card, wherein the open position of said door does not interfere with the engagement of said slide rail and the server cabinet.

2. The computer of claim 1, further comprising:
   a card cage that is releasably attached to said system board;
   a riser card releasable attached to said card cage, connected to said system board, and providing connection points for a plurality of add-in cards oriented perpendicular to said riser card; and
   a plurality of add-in cards connected to a corresponding number of connection points on said riser card, wherein said opening is sized so as to allow passage of more than one of said plurality of add-in cards.

3. The computer of claim 1, wherein said add-in card is a PCI card.

4. The computer of claim 1, wherein said add-in card is a hot-pluggable PCI card.

5. The computer of claim 2, wherein said add-in card and said card a can be removed from the computer without tools.

6. The computer of claim 1, wherein said chassis has a height of 2U or less.

7. A method for replacing a horizontally mounted add-in card in a server stored in a server rack, wherein the server is contained within a chassis having front panel, a first side panel, a second side panel, and a rear panel all mounted on a base and forming a rectangular enclosure with a removable top panel, said method comprising:
   extending the server from the server rack on rails attached to the chassis;
   removing the top panel from the chassis;
   opening a door in the first side panel that allows access to the add-in card;
   removing the add-in card from a slot on a riser card;
   inserting a new add-in card into the slot on the riser card;
   closing the door;
   replacing the top panel;
   retracting the server into the server rack, wherein all of the above steps are performed while the server is operating and connected to the server rack, without the use of any tools; and wherein opening the door does not interfere with engagement of the rails and the server rack.

8. A computer, comprising:
   a chassis having a front panel, a side panel, and a rear panel all mounted on a base and forming a rectangular enclosure;
   a slide rail disposed on each side panel and adapted to engage a server cabinet;
   a system board attached to said base;
   at least one add-in card connected to said system board and oriented to be substantially parallel with said system board;
   a means for opening a portion of said side panel adjacent to said add-in card sized to allow access to said add-in card through said side panel while said slide rails are engaged with the sewer cabinet; and wherein opening the portion of said side panel adjacent to said add-in card does not interfere with engagement of said rails and said server cabinet.

9. The computer of claim 8, further comprising:
   a means for connecting a plurality of add-in cards oriented parallel to said system board; and
   a plurality of add-in cards, wherein more than one of said add-in cards can be accessed through said side panel.

* * * * *